Figure 9:
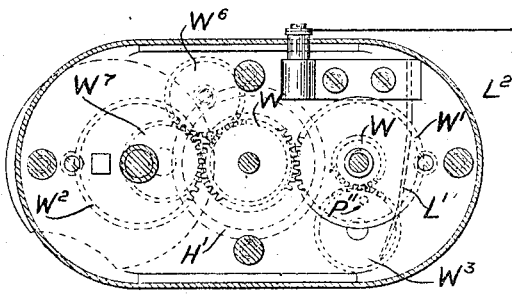

No. 648,786. Patented May 1, 1900.
E. PHILLIPSON, H. M. BAKER, Jr. & W. B. SABEL.
VAPOR BURNING APPARATUS AND SYSTEM.
(Application filed Apr. 3, 1900.)
(No Model.) 6 Sheets—Sheet 1.
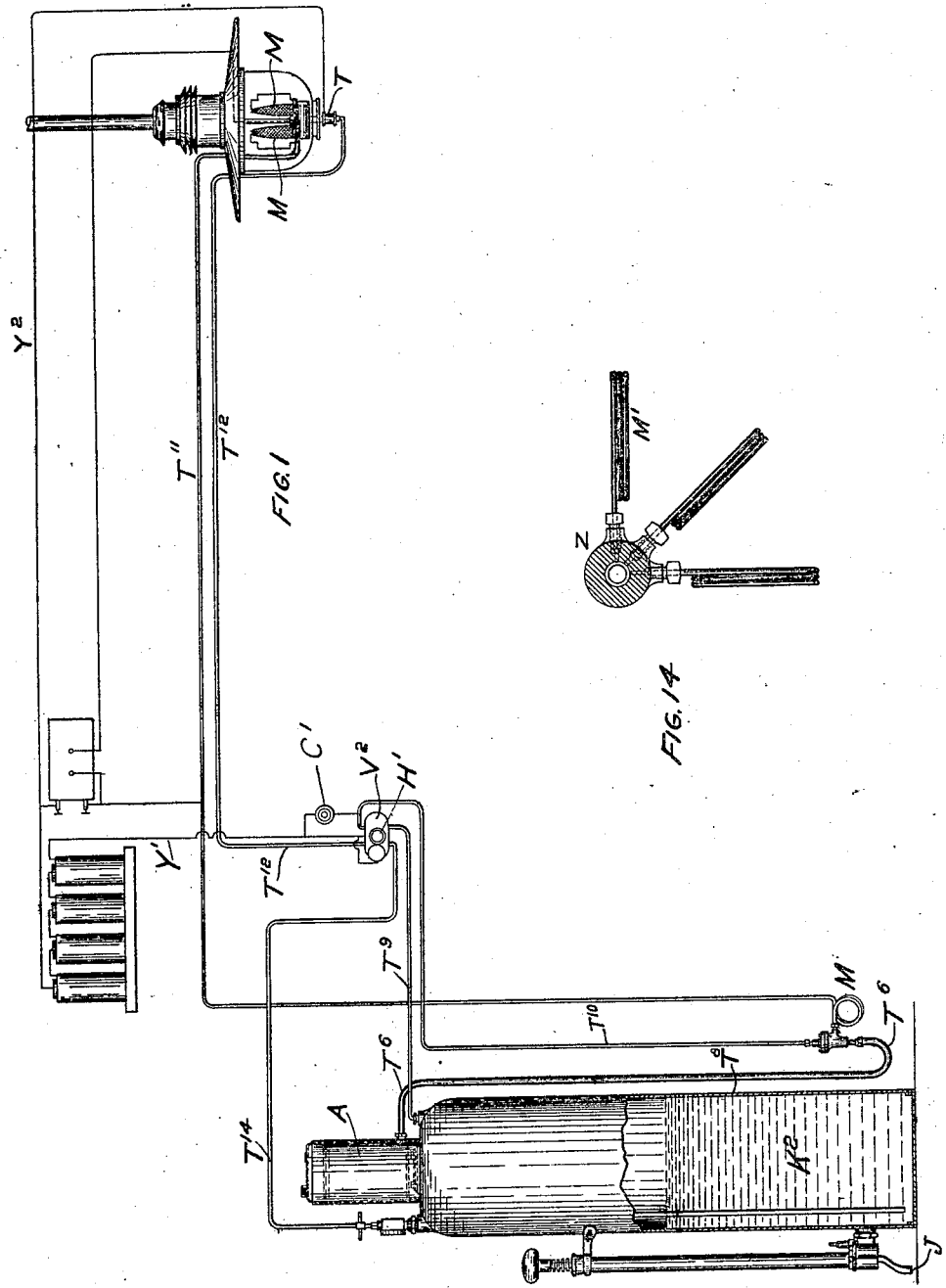

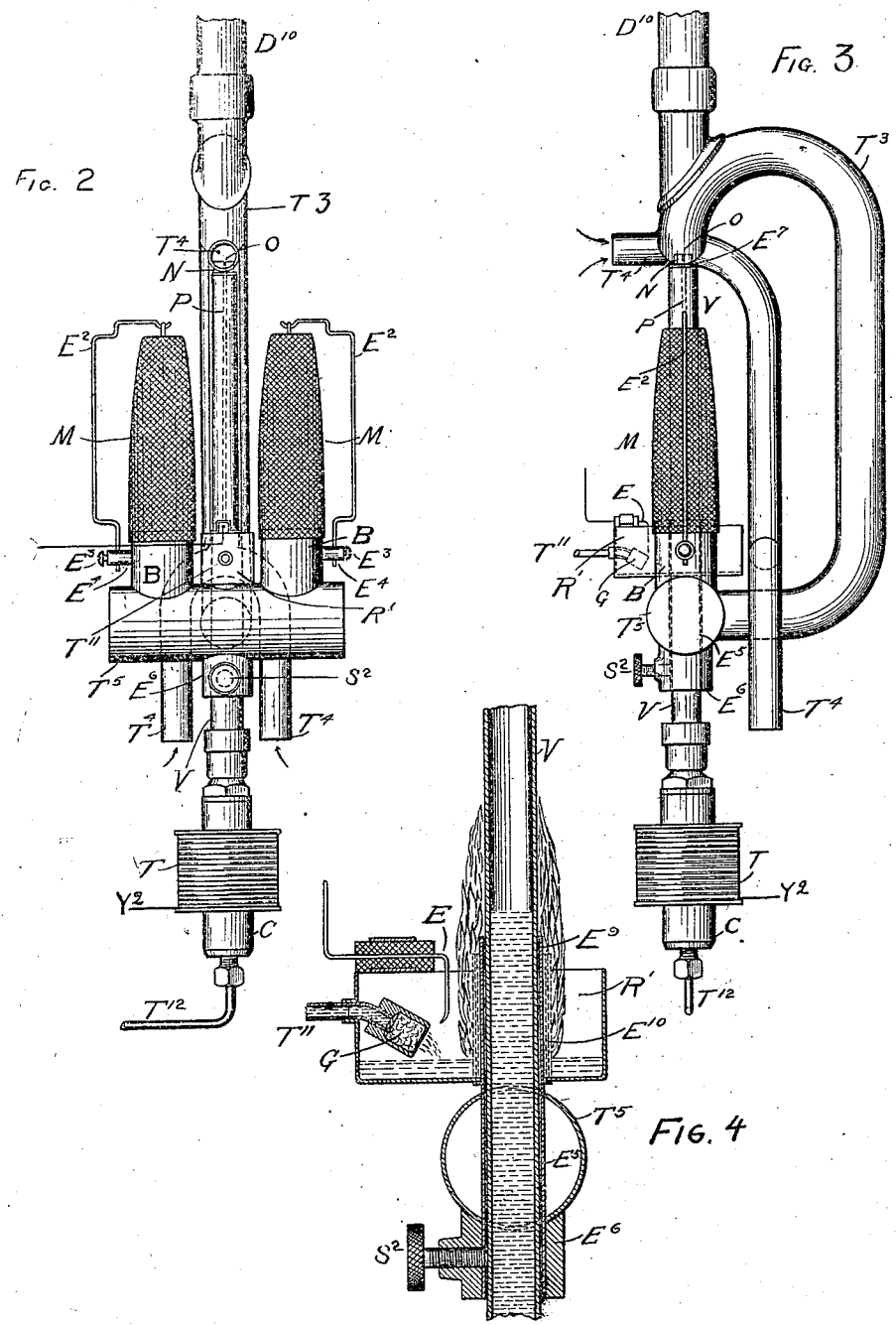

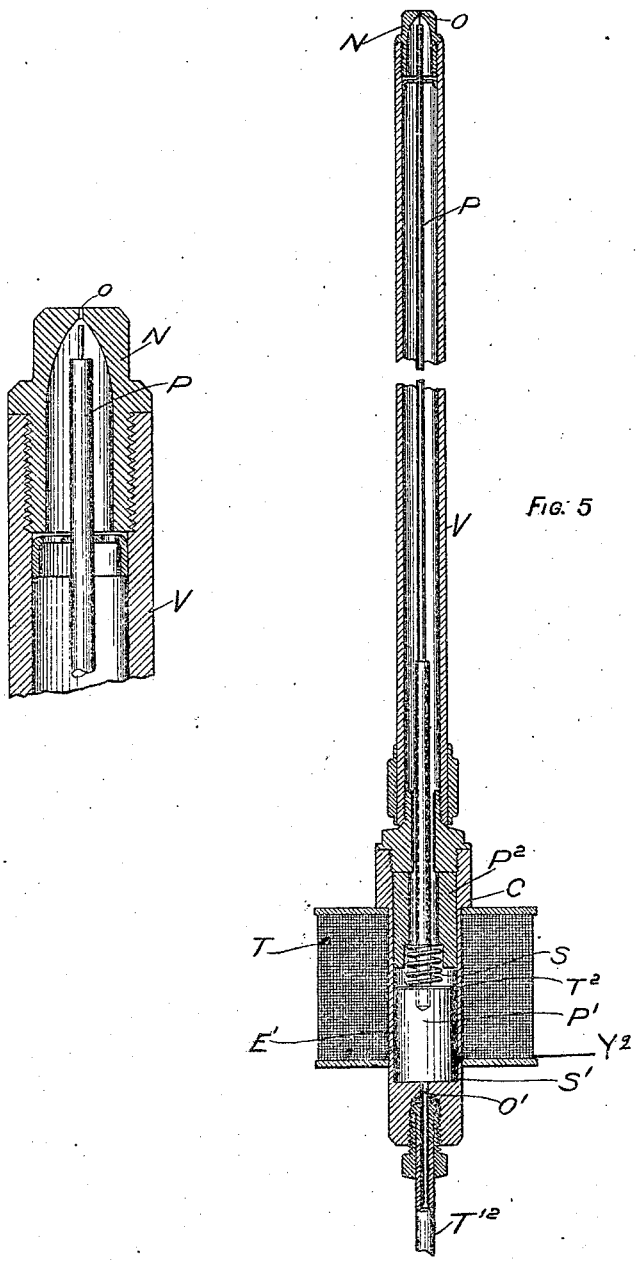

No. 648,786. Patented May 1, 1900.
E. PHILLIPSON, H. M. BAKER, Jr. & W. B. SABEL.
VAPOR BURNING APPARATUS AND SYSTEM.
(Application filed Apr. 3, 1900.)
(No Model.) 6 Sheets—Sheet 4.
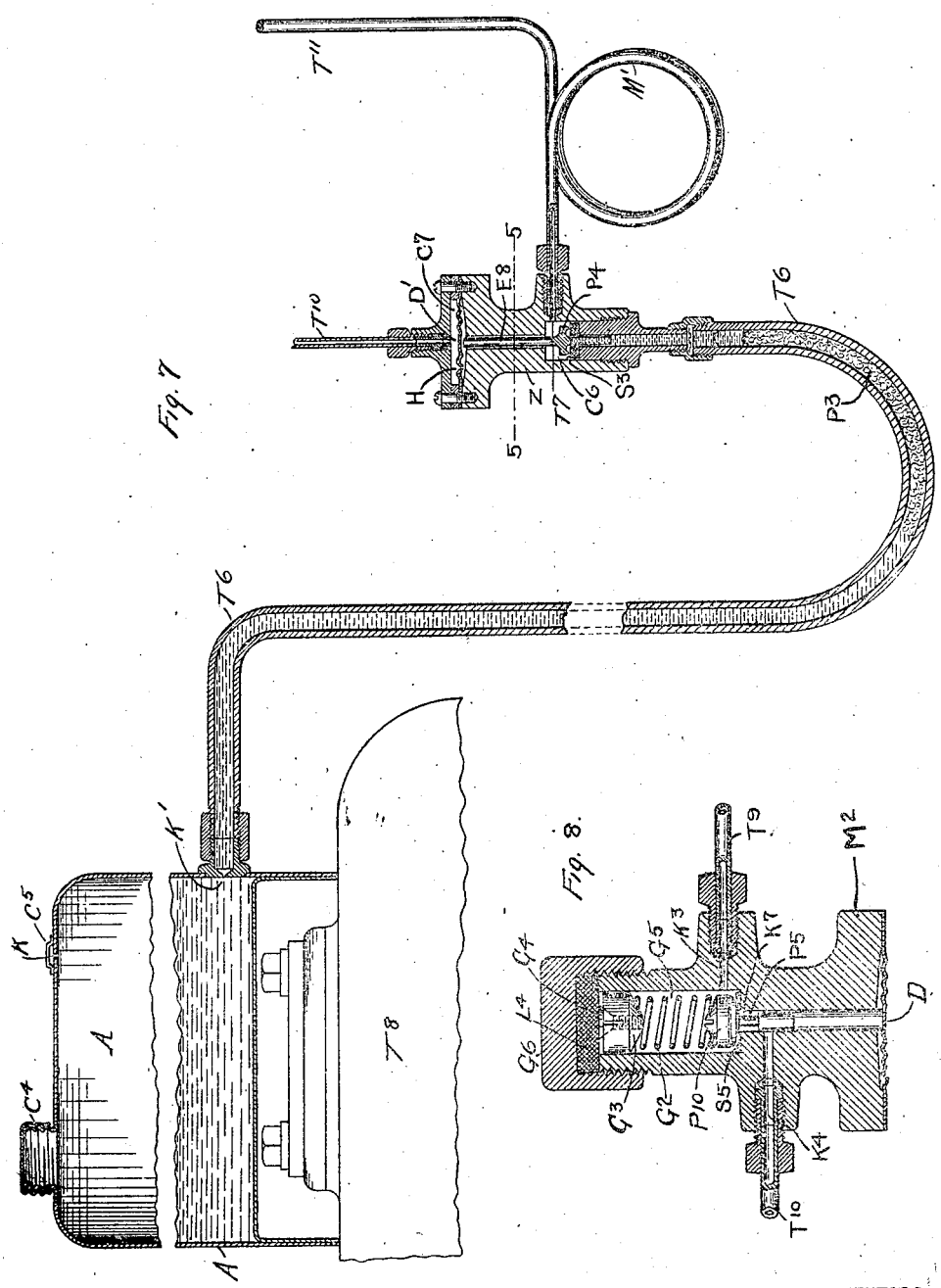
WITNESSES
INVENTORS No. 648,786. Patented May 1, 1900.
E. PHILLIPSON, H. M. BAKER, Jr. & W. B. SABEL.
VAPOR BURNING APPARATUS AND SYSTEM.
(Application filed Apr. 3, 1900.)
(No Model.) 6 Sheets—Sheet 5.

WITNESSES
INVENTORS

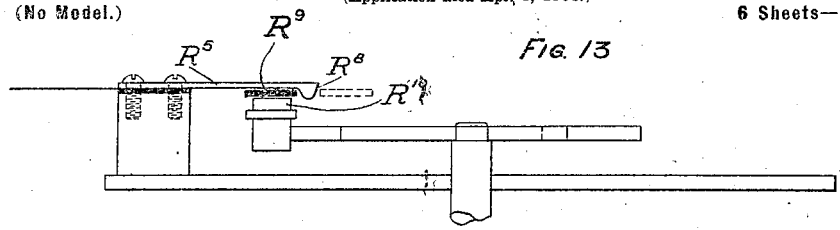
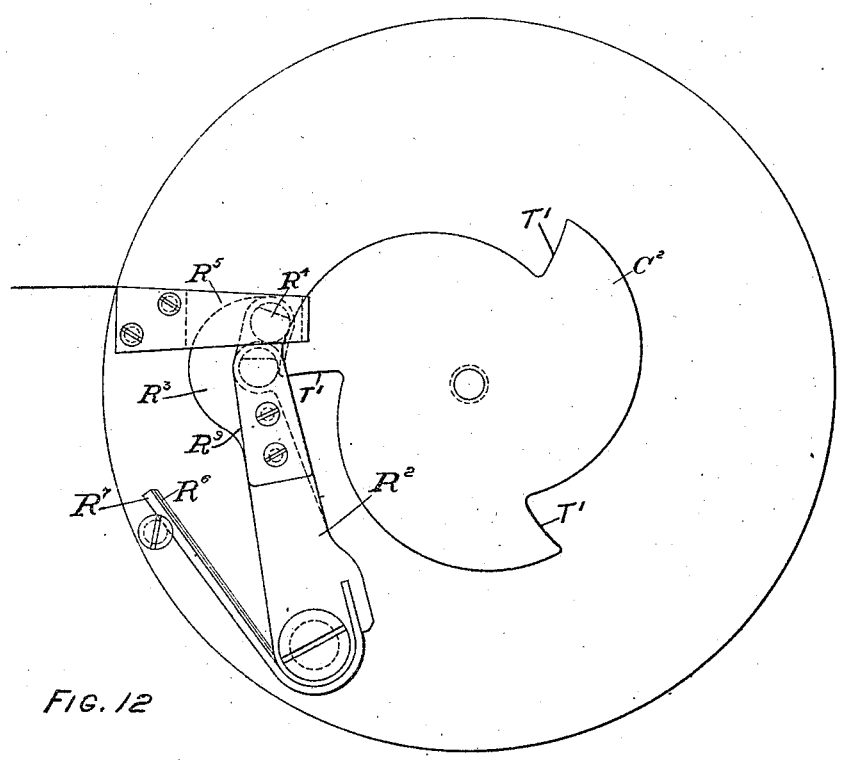
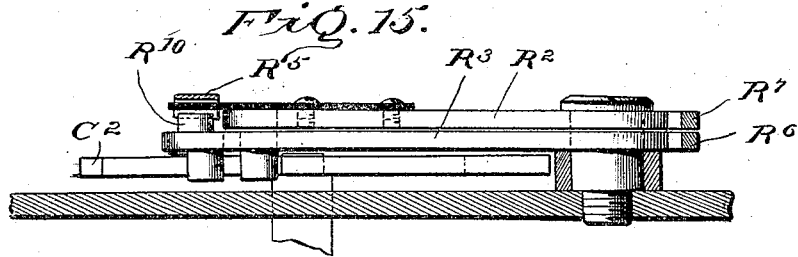

UNITED STATES PATENT OFFICE.

EMIL PHILLIPSON, HAYDN M. BAKER, JR., AND WILLIAM B. SABEL, OF NEW YORK, N. Y.; SAID SABEL ASSIGNOR TO SAID PHILLIPSON AND BAKER.

VAPOR-BURNING APPARATUS AND SYSTEM.

SPECIFICATION forming part of Letters Patent No. 648,786, dated May 1, 1900.

Application filed April 3, 1900. Serial No. 11,283. (No model.)

*To all whom it may concern:*

Be it known that we, EMIL PHILLIPSON, HAYDN M. BAKER, Jr., and WILLIAM B. SABEL, citizens of the United States, residing in the borough of Brooklyn, city of New York, county of Kings, and State of New York, have invented a new and useful Vapor-Burning Apparatus and System, of which the following is a specification.

Our invention relates to improvements in vapor-burning apparatus for and in the system of making and mixing hydrocarbon vapors with air and burning the same; and some of the objects of our improvements are, first, to provide means for automatically measuring a charge of inflammable fluid on its way to the ignition-cup located between the tank or source of supply and the ignition-cup, which cup is located adjacent to the vaporizing tube or receptacle; second, to provide means for lighting the automatically-measured charge of inflammable fluid in the cup for the purpose of initially heating the vaporizing tube or receptacle to a suitable degree, and thereby later properly vaporizing the initial charge of hydrocarbon oil in said tube or receptacle; third, to provide means to effect a proper automatic feed-supply of hydrocarbon oil or for supplying hydrocarbon oil automatically at proper intervals from a tank or source of oil-supply to the vaporizing-tube and at the same time or while giving motion to a valve located in the channel of the oil-supply for opening and closing the same also and by the same means and pressure giving motion to a device that is a closer, a plunger, and a cleaning device, preferably all in one, for the purpose of closing, opening, and cleaning the normally-open orifice or outlet of the vaporizing-tube; fourth, to provide means for lighting the burner or burners of the lamp or heater initially; fifth, to provide means for automatically removing the solid products of combustion and other impurities from the normally-open orifice or vapor-outlet of the vaporizing tube or receptacle, so as to maintain its normal capacity in the delivery of hydrocarbon vapors to the mixing tube or tubes, accomplishing this object by means of an automatic plunger or cleaner that will automatically and at proper intervals enter and leave, and thereby clean and keep open, the orifice of the vaporizing-tube, the plunger or cleaner being operated primarily and secondarily by oil-pressure and thirdly by electromagnetic or other means; sixth, to provide means and arrangement of means to consume the remaining vapors generated after the oil-supply is shut off prior to extinguishing the burner or burners; seventh, to provide means or apparatus for initiating the automatic operation of the lamp or heater involving the supplying of the inflammable fluid, the lighting of the inflammable fluid, the supplying of the hydrocarbon oil, the vaporizing of the oil, the cleaning of the vapor-escape orifice, the mixing of the vapors with air, the lighting of the vapor in a burner or series of burners, and the consumption of the remaining vapors, all by the manipulation of a single hand-wheel, lever, or device either intermittently or continuously, and eventually also the extinguishment of the lamp or heater by or through the reverse movement thereof; eighth, to provide means capable of absolutely preventing the leaking of oil under pressure and of becoming more tight as the pressure exerted upon the oil is increased, consisting of a valve or combination of valves and other associated parts located in the channel of oil-supply; ninth, to provide means whereby all necessity of using or depending upon packing in and about such valves is avoided; tenth, to provide means to prevent leakages of oil from the vaporizing-tube, and, eleventh, to provide means and combinations of parts for the preliminary heating of inducted air to a higher degree before it reaches the point of mixing with the vapor at the orifice of the vaporizing-tube, and thereby producing superior effects at the vapor-outlet of the vaporizing tube or receptacle in the mixing tube or tubes and at the burner or burners.

The further objects of the invention may be inferred from the drawings, the body of the specification, and the claims.

We attain these objects by the mechanism illustrated in the accompanying drawings, in which—

Figure 10:
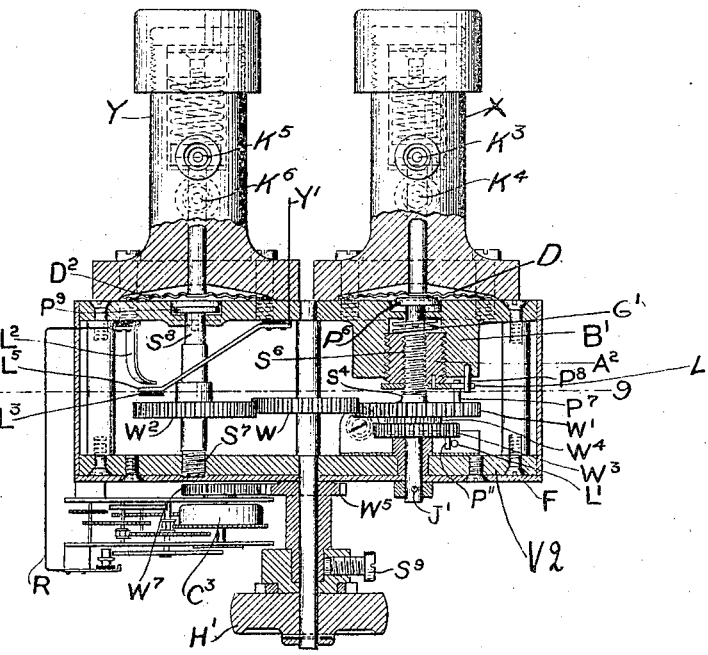
Figure 11:
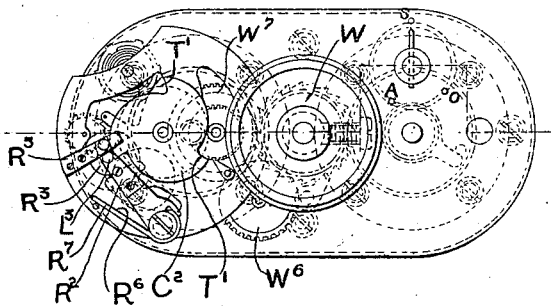

Figure 1 is a view of the complete system for burning hydrocarbon vapors mixed with air, together with receptacles for alcohol and oil, a valve and measuring device for the same, a combination wall-valve, electrical batteries and spark-coil, mechanism for making and breaking electrical circuits, and a lamp with all proper connections. Figs. 2 and 3 are different views and elevations of the lamp. Fig. 4 is a longitudinal sectional view of the alcohol-receptacle at the lamp and the electrical connections, showing also a section of the vaporizing-tube running through it. Fig. 5 is a complete sectional view of the vaporizing-tube and associated parts. Fig. 6 is an enlarged sectional view of the upper portion of the vaporizing-tube and the plunger operating in the same for the purpose of cleaning the vapor-outlet opening. Fig. 7 is a sectional view of the alcohol-tank, valve, and measuring device and connections. Fig. 8 is a sectional view of a part of the wall-valve or starting apparatus for regulating the feed of the alcohol to the ignition-cup and the oil to the vaporizing-tube. Fig. 9 is a sectional view cut on line 9 9, Fig. 10, of the wall-valve, showing the train of gears and electrical connection for lighting the inflammable fluid in the cup. Fig. 10 is a cross-sectional view of the wall-valve with the clock attachment. Fig. 11 is a front view of the wall-valve with the clock attachment. Fig. 12 shows the electrical connections in the clock of the wall-valve on an enlarged scale. Fig. 13 is a section thereof, enlarged; and Fig. 14 is a top view of a plurality of the automatic measuring devices. Fig. 15 is a view of the parts at right angles to that shown in Fig. 13.

Similar letters relate to similar parts throughout the several views.

The vaporizing-tube V is shown in Figs. 2, 3, 4, and 5 and is furnished at its upper end with a terminal, having a small perforation or opening O therethrough, which may be a detachable nozzle N, and also having located in its vertical center a plunger P. In either case the parts may be made of platinum and the plunger or a part of the same may also be made of the same material. The vaporizing-tube is secured upon the top of a cylinder C, which is provided with the piston P', to the top of which is secured the lower end of the plunger or cleaner P.

The piston P' is located in the cylinder C and at and near its bottom edge has a seat S' and there forms a valve to regulate the supply of oil to the upper portion of the cylinder C and the vaporizing-tube. This piston is operated in an upward direction by oil-pressure acting on the lower end of the piston and in a downward direction by the constant pressure of the spring S, aided by the downward pressure of the vapor generated in the vaporizing tube or receptacle, which takes effect on the top of the piston, and thereby assists the spring S. By or through the variation of relative pressures upon the upper and under ends or sides of the piston the movements and operations of the piston P' and the plunger P are controlled.

Through the opening O' oil is admitted under the piston P'. The oil being under pressure from the oil-tank T⁸, the piston P' is raised thereby against the resistance of the spring S, and at the same time and thereby the reduced point of the plunger P is caused to enter or pass up into and with its extreme end through the opening O, wherein, for the time being, it remains and closes the vapor-outlet of the vaporizing-tube or prevents the escape of oil or vapor preparatory to the sufficient vaporizing of the oil therein. When sufficient pressure has been produced in the vaporizing-tube, its back pressure upon and communicated through the oil takes effect upon the top of the piston P' and aided by the spring S causes it to move down to or near the bottom of the cylinder C, thereby checking or regulating, but not entirely shutting off the oil-supply, retreating the plunger P, and opening the opening O, so as to allow the escape of the vapor on the way to the mixing-tube. The plunger P has two functions, one, principally an initial function on starting the burner, to close the opening O and thereby initially prevent the escape of oil and later the too early escape of vapor, and the other to remove from time to time the deposit of carbon in and near the opening O, which would otherwise close or obstruct the opening O to such an extent as to interfere with the passing of the hydrocarbon vapor, either wholly or in proper quantity, on the way to the mixing-tube and the burner or burners B.

After the plunger or cleaner P is retreated by the aid of sufficient vapor-pressure and the vapor has been properly mixed with air and conducted to the burner the burner becomes lighted in the manner to be hereinafter described.

While the burner is in operation the plunger P, moving with the piston P', vibrates back and forth and keeps the opening O open or clean by removing the carbon deposits moved by the automatically varying oil and vapor pressures from below and from above, respectively, and in combination with the spring S. The plunger P during these operations is moved into and out of the opening O so quickly as not materially to interfere with vapor movement therethrough and at no time sufficiently to extinguish the burner, the function of the plunger at this stage and particularly when the lamp is in operation being only to remove the carbon deposits and then instantly retreat and not being to close the opening O or to enter it for the purpose of itself in any way regulating the flow of the vapor during the operation of the burner, but being the maintenance of the uniform dimensions of the opening O for the purpose of permitting the flow of the uniform and regular quantity of vapor into the mixing-tube on the way to the burner or burners. In detail the operation of this part of the invention is as follows: Upon the passage of the oil through the opening O' the pressure of and through the oil thereon is sufficient to raise the piston P' against the pressure of the spring S, sustained on and by the iron core P². As the piston P' rises and moves toward the upper end of the cylinder C the way is opened for a portion of oil to pass between the piston and its cylinder and into the vaporizing-tube. The adjustment of the spring S is such that it will at no time during the continuous operation of the burner, even when aided by the back pressure created by the vapor, entirely and positively seat the piston P' on the seat S', as the pressure of the oil from the tank T⁸ will always keep it slightly elevated or removed from the seat S', thereby permitting a continuous supply of oil to pass around the outer walls of the piston P' into the vaporizing-tube. The piston P' is positively seated on the seat S' only when the lamp is not in operation, when the pressure of the oil being taken off the spring S holds the piston down on the seat or bottom of the cylinder C. The hydrocarbon vapor after passing out through the opening O passes into a conductor tube or tubes T³ and therein mingles with the outer air which has entered through the open air-induction tube or tubes T⁴. (Shown in Figs. 2 and 3.) The combined or mixed air and hydrocarbon vapor passes through the tube T³ into the tube T⁵, and thence into the burners B, which burners are located adjacent to or surround the vaporizing-tube V and communicate heat thereto and therethrough for the purpose of continuously vaporizing the oil. The inlets of the air-induction tube or tubes being located in the forked lower end of the tube T⁴, Fig. 2, below the burner and the mantle and also preferably below the globe which incloses the burner in the usual way, and the upper end of the tube T⁴ being located in the highly-heated zone of the lamp adjacent to and above the mantle or mantles, so as to take a large quantity of heat therefrom, a large supply of cooler air rich in oxygen will be drawn into the induction-tube and given a strong upward impulse toward and into the mixing-tube T³, thereby assisting or facilitating the movement of the hydrocarbon vapor in that tube. The descending mixed air and vapor passing through the tube T⁵ will not, since that tube is placed at a greater distance from the mantles than the tube T⁴, conduct a further amount of heat to the descending current, so as to materially interfere with its downward movement; but as soon as the mixed air and vapor reaches the tube T⁵ the heat derived from the burning mixed air and vapor will take effect thereupon and give the same a definite upward movement to and through the burners, thereby facilitating to some extent the whole movement and the function of all the associated parts of the lamp, of the upper end of the tube T⁴, being located within the globe and above the mantle, will take in and draw off the hot air from the globe or ventilate the same. However, the inlet of the tube T⁴ just described may be closed or that part of the tube may be omitted, if desired. Arranged in this way the heat from the mantle is employed in giving the inducted air an upward movement toward the initial mixing-point and through the further connecting tube or tubes to the burners and does not interfere with any desired downward movement at any point. An additional advantage of this construction and method of air induction and impulse is that when the oil is turned off and the pressure of the vapor within the vaporizing-tube begins to diminish the heat remaining in the walls of the air-induction tube will continue the air-induction impulse, and thereby carry the remaining vapor into and through the mixing-tube and the burner until all is consumed and the usual noxious odors avoided.

The incandescent mantles M, Figs. 2 and 3, surround the burners B and are supported by the holders E², which holders are held in position by a screw E³, secured in the plug E⁴, or by any other convenient means. The mantles M are made incandescent by the heat of the burning of the combined vapor and air. A hand-screw S² is used for fastening the vaporizing-tube V onto the collar E⁶ on the gas-tight tube E⁵, running vertically through the tube T⁵, for the purpose of permitting the vaporizing-tube V to pass through the tube T⁵ and into the aperture E⁷ in the tube T⁴, Fig. 3.

That portion of the apparatus and its operation that has to do with the initial vaporization of the oil preparatory to the lighting of the burner will now be described.

The tank or receptacle A, Fig. 7, for alcohol or other inflammable fluid is preferably located on top of the oil-tank T⁸.

C⁴ is a screw-cap on top of the tank A.

K is a minute air-inlet hole in the tank A, covered by the cap C⁵, for the purpose of preventing dust or impurities reaching the inside of the tank A, while at the same time admitting a minimum amount of air, the air being admitted for the sole purpose of taking the place of the alcohol or fluid as it is drawn off, thereby preventing a vacuum. A minute opening K' connects the tank A with the tube T⁶. The inflammable fluid passes by gravity through said tube T⁶ and through the loose-packing filter P³ into the chamber C⁶ of the fluid-valve Z, raising the piston P⁴ from the seat S³ for the purpose, and from said chamber the fluid passes through the channel T⁷ into a coil or measuring device M', Fig. 7. The measured quantity of fluid in the measuring device being forced onward by the compressed air, as hereinafter explained, passes from the measuring device M' into and through the tube T¹¹ and through gauze obstructions G, near the end thereof, into the ignition cup or box R' at a point in proximity to the end of the electrical igniter E. The gauze obstructions are for the purpose of insuring steady delivery of the alcohol or inflammable fluid. The adjustment of the coil or measuring device is such that it will contain a little in excess of the quantity of fluid required for the heating of the vaporizing-tube V and for the initial vaporization of the oil and enough to burn sufficiently long thereafter to ignite the combined or mixed air and hydrocarbon vapor as they reach and pass from the burner B. The adjustment of the measuring device is controlled chiefly by the weight of the piston P⁴, Fig. 7. From this time on the apparatus is in condition to continue in operation automatically or without interference until it is decided to extinguish the same.

T⁸, Fig. 1, represents the tank or reservoir in which the oil is stored under pressure. The shaded portion K² represents the oil, and the upper portion of the tank contains the air pumped in by any convenient means through the inlet J. The compressed air enters the tube T⁹ preferably from the upper portion of the oil-tank, but may be supplied from an independent source. The compressed air in the tube T⁹ continues its effects up to and into the chamber G⁵, Fig. 8, of the air-valve X of the starting apparatus. On turning the hand-wheel H' the plunger P⁶, Fig. 10, creates pressure upon the diaphragm D', which causes the valve-piston P¹⁰, Fig. 8, to rise from its seat S⁵ and permit compressed air to pass from the chamber G⁵ through the channel or outlet K⁴ into the tube T¹⁰ and thence into the chamber C⁷ of the fluid-valve Z, Fig. 7. As the compressed air enters the chamber C⁷ it exerts a pressure upon the diaphragm D', thereby causing the piston P⁴ to become firmly reseated on the seat S³, and thereby preventing any further flow of inflammable fluid from the tube T⁶. A minute hole H in the diaphragm D' permits compressed air to pass through the diaphragm downward alongside the rod E⁸ below into the chamber C⁶ and thence through the tube T⁷ into and through the measuring device M' and the tube T¹¹, thereby making contact with the alcohol and also forcing it onward and eventually into the ignition box or receptacle R', Figs. 3 and 4, through which the vaporizing-tube V on the burner passes. The same result may be accomplished by establishing an outward or other connection with the chamber C⁷ on one side of the diaphragm D' and the space between the rod E⁸ and the chamber C⁶, thereby rendering the small hole H in the diaphragm D' unnecessary and still obtaining the same results.

The receptacle or ignition-box R', as shown in Fig. 4, is preferably rectangular in shape and open at the top only. At a convenient point in, passing through the bottom, and extending to the top of the receptacle R' a tube E⁹ is shown, through which the vaporizing-tube V passes. Several thicknesses of gauze E¹⁰ are wound around the outer walls of the tube E⁹, acting as a wick and aiding to hold the encircling flame thereof in such relation to the vaporizing-tube V as to cause the heat to be conducted to the vaporizing-tube.

An electrical igniter E, Fig. 4, is located on top of and extends into the receptacle R', and connected with a spark-coil or other electrical devices is a wire leading directly from the point of connection on the burner to the combination wall-valve or starting apparatus V², (shown in detail in Figs. 9, 10, and 11,) while the other electrical connection is made through any one of the tubes connecting the starting apparatus with the lamp. Independent connections would of course serve the same purpose.

A left-hand motion of the hand-wheel H' of the starting apparatus V², Figs. 9, 10, and 11, causes the piston P¹⁰, Fig. 8, to rise from its seat S⁵, as before explained, and permits the compressed air to pass from the tube T⁹, Fig. 8, through the opening or channel K³ to and through the opening or channel K⁴ and thence through the tube T¹⁰ into the chamber C⁷ above the diaphragm D' preparatory to performing the operation previously described of sending the measured quantity of fluid to the ignition-receptacle R' on the lamp. The same motion of the hand-wheel H' continued, as will be hereinafter explained, completes at the proper time the electric circuit, so that the fluid in the receptacle R' is ignited by an electric spark from the electrical igniter E. Further motion of the hand-wheel H' in the same direction breaks the electric connection and closes or occludes the connection established between the openings or channels K³ and K⁴, thus preventing any further flow of air through the tube T¹⁰ and again establishing the conditions and relations of parts whereby the fluid from the tank A may pass to and through the starting fluid-valve Z, Fig. 7, into the measuring device M' preparatory to the delivery of a new charge of inflammable fluid to the burner when next starting the apparatus. The alcohol-valve Z and the measuring device M' jointly comprise the automatic measuring device for the inflammable fluid.

The opening K' in the alcohol or inflammable-fluid tank A is made extremely small for the purpose of establishing a slow feed to and through the valve Z into the measuring device M'. This is done for purposes of safety, the delivery of an excess of fluid to the receptacle R' being impossible for the reason that the quantity of fluid first delivered into the receptacle R' ignited upon its entrance therein by the electrical spark or other means, as stated, will be consumed and the flame will go out or be extinguished before another charge can be passed into the measuring device M'. The supply-opening K' being very small cannot supply enough fluid to create dangerous conditions. Preferably after the necessary time has elapsed to permit the inflammable fluid to heat the vaporizing-tube V to the vaporization-point of oil the hand-wheel H' should be given a further turn in the same direction, whereby an open connection will be established between the oil-port K³, Fig. 10, and the tube T¹⁴, Fig. 1, and the oil thereby be permitted to flow through the tube T¹² into the opening O', (see Figs. 2, 3, and 5,) with which it connects.

The operation of the parts thereafter is as follows: The oil entering from the opening O' under pressure raises the piston P' not only sufficiently to permit the point of the plunger P to penetrate the orifice O, but also to force a quantity of oil through the cylinder C and thence into the vaporizing-tube V. The instant the oil strikes the walls of the vaporizing-tube V, which have become heated by the flame in the ignition-box R', vapor is created and pressure begins and is rapidly developed within the tube V by the continued vaporization of the oil until presently it becomes very powerful. After the oil has been admitted to the vaporizing-tube at the beginning the orifice O being entirely closed by the fine point of the plunger P a powerful back pressure is exerted by the vapor, which forces a large portion of the oil back upon the top of the piston P', so that it, aided by the spring S, forces the piston P' down, nearly seating it on the seat S', thereby withdrawing the plunger P from the orifice O and permitting the vapor to begin to escape from the tube V. During continuous operation of the burner the plunger P is constantly vibrating into and out of the orifice O, acting as a constant disturber of any and all obstacles accumulating in or near the said orifice O and at times automatically plunging completely through and thoroughly cleaning the orifice. This plunging entirely through we find is due in part to an occasional squirting of a drop or two of oil against the heated walls of the vaporizing-tube beyond or in excess of that which normally enters, thereby generating a momentarily-greater volume of vapor and exerting a greater back pressure upon the top of the piston P', which when an instant later relieved permits the oil-pressure through the orifice O' to drive the plunger more completely through the orifice O. It will be noticed that the plunger P or its fine point positively does in no instance act as a valve for the regulation or control of the vapor. The turning of the hand-wheel H', Figs. 9, 10, and 11, turns the center gear-wheel W and simultaneously the two gear-wheels W' and W².

A turn to the left of the hand-wheel H' will thus result in advancing the screws S⁴, simultaneously causing the plunger P⁶, secured to the end of the screw S⁴, to be forced against the diaphragm D of the air-valve X, forcing said diaphragm inward sufficiently to force the piston P¹⁰, Fig. 8, from its seat S⁵ and permitting the exit or escape of the air which has initially entered at K³ to and through K⁴ and the tube T¹⁰ to the valve Z, connected with the alcohol-tank A, as shown in Fig 7. A further turn in the same direction causes the pin P⁷, which is fastened on the gear-wheel W', to force the lever L in the opposite direction to the turning of the hand-wheel H', but in the same direction as the screw S⁴, and simultaneously turning the screw S⁶, to which the said lever is attached. The screw S⁴ moves in a screw-thread A² cut in the center of the screw S⁶. The threads on the two screws S⁴ and S⁶ run in opposite directions—that is to say, S⁴ is a right-hand screw and S⁶ is a left-hand screw. The continued motion above referred to causes the screw S⁶ to turn in the bushing B', thereby receding the screw S⁴ and moving the plunger P⁶ out of contact with the diaphragm D, and thereby also causing the air to be shut off. The continuous motion of the hand-wheel H', which later on acts upon and operates the oil-valve Y, does not affect any part of the workings of the air-valve X, the operation of which can only be started again after the hand-wheel H' has been returned to its original position. A stationary stop-pin P⁸ is located on the bushing B' for the purpose of stopping the lever L on either side, as the operation of the air-valve X requires. A friction-spring G' is located in the bottom of the bushing B', so as to press upon the bottom of the screw S⁶, thereby causing friction between the thread A² upon the said screw S⁶ and the bushing B' and preventing the lever L from being turned through any unevenness or any inequality of the screw S⁴ in the center. The screw S⁶, having a thread opposing that of the screw S⁴, but turning in the same direction as the screw S⁴, causes the screw S⁴ to withdraw the plunger P⁶ from the diaphragm D, thus again permitting the piston P¹⁰, Fig. 8, to return to its seat S⁵ and shutting off the communication between the air-inlet K³ and the air-exit K⁴. While the screw S⁴ is originally forcing down the plunger P⁶, Fig. 10, an electric connection with the circuit leading to the ignition-box R' is made by means of a pin P¹¹, which is attached to the gear-wheel W³, the gear-wheel W³ being in connection with the gear-wheel W⁴. This electrical connection is made by the pin P¹¹ striking against and moving for a short distance along the spring-lever L', connected with the circuit, it becoming released therefrom as the gear-wheel W³ moves farther. An indicator J' is attached to the axis of the gear-wheel W³ on the outer side of the face-plate F, where marks indicate the position of the pistons in the valves X and Y. Coincidently with the turning of the hand-wheel H' and through the action of the axis of the gear-wheel W² and the screw S⁷ the plunger P⁹ moves toward the diaphragm D² of the valve Y, but does not act upon or press against the diaphragm D² until after the plunger P⁶ has been withdrawn from the diaphragm D in the valve X. What we accomplish thereby is the following: The act of the plunger P⁶ forcing the diaphragm D and the piston P¹⁰ in the valve X allows the compressed air entering from the opening K³ to pass through the valve X between the piston P¹⁰, Fig. 8, and the seat S⁵ into and through the opening K⁴ and into the tube T¹⁰, communicating with the automatic measuring device, Fig. 7. The withdrawal of the plunger P⁶ from the diaphragm D again shuts off this connection by allowing the piston P¹⁰ to become reseated on the seat S⁵ by the force of the spring G² and the air-pressure on top of the piston. In the interim between the opening and closing of the valve X the alcohol has been forced by the compressed air from the measuring device M' into the ignition-receptacle R' on the burner, as specified. During this operation the oil-valve Y has remained closed; but the subsequent opening of said valve by the pressure of the plunger P⁹ on the diaphragm D² (caused by the continued motion in the same direction of the hand-wheel H', unseating the piston P¹⁰ from the seat S⁵ in the oil-valve Y) permits the oil to flow from the opening K⁵ of the tube T¹¹ through the valve Y into the opening K⁶ and through the tube T¹², Fig. 2, as specified. After this a turn of the hand-wheel H' will increase or diminish the flow of oil to the burner, as it opens or closes the aperture between the piston P¹⁰ and the seat S⁵ in the oil-valve Y without any reference to the air device in the air-valve X. The non-interference of such motion with the valve X is due to the fact that the plunger P⁶ has been coincidently withdrawn a considerable distance from the diaphragm D in the valve X at the time that the plunger P⁹ exerts a pressure upon the diaphragm D² in the valve Y. While the plunger P⁹ moves toward the diaphragm D² in the valve Y the plunger P⁶ recedes still farther from the diaphragm D in the valve X. After the air connections through the valve X have been severed and the plunger P⁹ by pressure on the diaphragm D² unseats the piston P¹⁰ from the seat S⁵ in the oil-valve Y an electrical connection in the circuit leading to the electrical helix T is made by means of the gear-wheel W², which by pressing against the insulation L³ closes the electric circuit at that point by creating a contact between the spring-levers L⁵ and L², as hereinafter shown. This electrical connection remains undisturbed during the entire period of operation of the lamp or burner.

In starting the apparatus by turning the hand-wheel H' the clock-movement shown in Figs. 10 and 11 is started after the gear-wheel W⁵, in connection with the gear-wheels W⁶ and W⁷, winds the spring which operates the clock and is contained in the case or cylinder C³. The continued movement of the hand-wheel H' up to the time when the oil in the valve Y is fully turned on and is supplied to the vaporizing-tube winds the said spring sufficiently to run the clock for fifteen hours, during which the burner is in operation. The cam C², Figs. 11 and 12, is so arranged as to make one revolution every hour. The revolving of the cam in a right-hand direction will at the proper time or times when the drop T' in the cam comes around allow the insulating-lever R² to drop. A moment later the contact-pin lever R³ will drop at the same place and during this motion will cause substantially-instantaneous electrical connection to be made between the contact-pin R⁴, the clock, and the electrical helix T on the vaporizing tube or receptacle through the connecting-batteries.

The electrical connections for the system referred to are as follows: The clock is connected to and forms a part of the wall-valve V². The spring-lever L⁵ in the wall-valve is insulated from the said valve, and the spring-lever L² is also insulated therefrom. L³ shows insulation on one side of the spring-lever L⁵. The spring-lever L² connects with the spring-lever R⁵, and the spring-lever L⁵ connects through the wire Y' with the batteries. Another wire Y² from the batteries runs to the electric helix on the vaporizing tube or receptacle and is thus connected with the lamp or burner through the contact between the said vaporizing-tube and the lamp or burner, making the entire system a part of the circuit. A forward movement of the gear-wheel W² sufficient to establish connection between the spring-levers L⁵ and L² makes a connection between the contact-spring R⁵ and the wire Y', leading to the batteries, the permanent direct connection between the batteries and the coil on the vaporizing-tube existing, which forms the electrical connection with the lamp or burner proper, and consequently also with all of its connecting-tubes and therethrough with the wall-valve V² and the clock, the only break in the circuit occurring because of the absence of connection between the insulated contact-spring R⁵ and the clock from which the said contact-spring is insulated. This connection when required is established as follows: The insulation-lever R² and the contact-pin lever R³ forced by the springs R⁶ and R⁷, respectively, against the outer rim of the cam-wheel C² are removed farther from the axis of the said cam-wheel C² as any one of the drops T' of said cam-wheel C² approaches the contact-spring R⁵. By this action the springs R⁶ and R⁷ are compressed temporarily. As the insulation-lever R² reaches the outer corner of the drop T' it is forced by the spring R⁶ down to that part of the outer rim of the cam-wheel C² which is nearest the axis of the said cam-wheel, thereby striking and passing the contact-point R⁸ of the contact-spring R⁵, withdrawing by the same motion the insulation R⁹ from the contact-pin R¹⁰ of the contact-pin lever R³. When a short time later the contact-pin lever R³ reaches the outermost point of the cam-wheel C², it also, forced by the spring R⁷, drops to the same point as the insulation-lever R² and while dropping strikes against and along the contact-point R⁸ of the contact-spring R⁵. The continued rotary motion of the cam-wheel C² will simultaneously raise both levers R² and R³, until twenty minutes later they repeat the operation just described. It is apparent that the instant the contact-pin R⁴ of the contact-pin lever R³ touches the contact-point R⁸ of the contact-spring R⁵ the entire electrical circuit is completed and that the cleaning device or plunger P in the vaporizing-tube will be caused thereby to operate, as hereinafter described. The insulation-lever R² is used solely for the purpose of preventing a contact or the formation of an electrically-closed circuit between the contact-pin R¹⁰ and any part of the system, except as hereinbefore stated, and the instant after such contact has been made by the contact-pin of the contact-lever R³ it again acts and continues to act as a guard, preventing the formation of an electrical contact, as stated. The instant such electrical circuit is completed the electricity passing through the coil T changes the iron core T² into a powerful magnet. The piston P' being made of iron also is instantly attracted thereby, being also magnetized by said current and instantaneously moved upward and against the iron core P², compressing the spring S and permitting additional oil to pass through the cylinder C or between the piston and the cylinder. A thin copper washer T² is located on top of the piston P' for the purpose of permitting the piston P' to recede from the core P² the instant the electric current ceases. It is apparent that were it not for this copper washer the magnetism which would remain in the core P² and the piston P' for a short period after the electrical current has been thrown off might detain the piston P', while because of the intervening copper the receding action of the piston P' from the core P² is also made instantaneous. The plunger P, being attached to the piston P', will, it is apparent, pass through and clean the vapor-escape orifice O the instant and by the same motion that the piston P' moves up against the magnetic core P² and will also upon the piston P' receding from the core P² recede from the said vapor-escape orifice, again permitting the free and unobstructed passage of the vapor through the said orifice O.

It is apparent that a cam in the clock attached to the wall-valve containing a greater number of drops or a more quickly revolving cam or other devices may be used and would more frequently cause the piston P' to rise and the plunger P to clean the vapor-escape orifice correspondingly oftener. It is also apparent that for the clockwork connected with the wall-valve, as shown, a properly arranged and insulated wall-clock may be substituted and provided with means for making contacts and operating the plunger as frequently as may be desired and in as many lamps or burners as may be desired. It is also evident that by similar means the same plunger or cleaning device may be adapted to and used to clean any vapor-orifice of any other vaporizing-tube however constructed.

The connection between the hand-wheel H' and the gear-wheel W⁵ is such that the spring contained in the case or cylinder C³ is wound up by means of frictional contact, and consequently when wound to its fullest extent any further turning of the hand-wheel H' in either direction will not affect the said spring thereafter nor will the further movement of the hand-wheel or winding device be limited thereby. Where an independent connection is desired for the purpose of igniting the inflammable fluid used for initial vaporization, the electrical connections can be made to a switch or push-button C', as shown in Fig. 1.

A turn of the hand-wheel H' in the opposite direction from that which inaugurates the operation of the system back to its original starting-point shuts off the oil and returns both plungers P⁶ and P⁹ to their original positions and sends the lever L back to the same side of the pin P⁸ where it was before starting.

Fig. 8 is a sectional view of the construction of the air-valve X and oil-valve Y of the starting apparatus. They are identical in construction. The only difference in their use is that the valve X is for the purpose of permitting compressed air to pass from the inlet K³ to and out of the outlet K⁴, while the valve Y is for the purpose of permitting oil under pressure to pass from the inlet K⁵ to and out through the outlet K⁶. A detailed description is as follows: P⁵ represents the stem of the piston P¹⁰, which is seated on a solder-seat S⁵ and held there firmly by the spiral spring G², one end of which rests against the top of the piston P¹⁰, while the opposite end rests against the beveled end of the plug G³. The plug G³ has a slot cut through it, so that when the screw G⁴ is screwed into it it will spread, thus firmly filling the space in the cylinder G⁵. A metal cap G⁶ is used for closing this end of each of the valves X and Y, it being screwed down tightly on the lead washer L⁴. The end of the stem P⁵ supporting the piston P¹⁰ rests inside of and against the diaphragm D, which diaphragm is secured in the metal case M² either by means of solder or by pressure.

The operation of the valves X and Y is as follows: The compressed air or oil enters the opening K³ or K⁵, as the case may be, passes into the cylinder G⁵, and, together with the pressure of the spring G², tends to firmly hold the piston P¹⁰ on the solder-seat S⁵. A pressure of the plunger P⁶ or P⁹ on the center of the outside of the diaphragm D sufficient to move the piston P¹⁰ from its seat S⁵ will permit the compressed air or oil, as the case may be, to pass between the piston P¹⁰ and the seat S⁵ and through the space K⁷, between the piston-rod P⁵ and the cylinder G⁷, into and out of the opening K⁴ or K⁶, as the case may be. It will also appear that on the release of the aforesaid pressure on the diaphragm the piston P¹⁰ will again seat itself upon the seat S⁵, thereby preventing any further communication between the openings K³ and K⁴ or K⁵ and K⁶, as the case may be. This is due, of course, to the dual pressure of the spring G² and the pressure of the air or oil on the top of said piston. The joint operation of the valves X and Y has been described elsewhere.

The plungers P⁶ and P⁹ are secured to the stems of the screws S⁴ and S⁷, respectively, in such a manner that when the said screws press the plungers against the diaphragms D and D² the plungers will press the said diaphragms without any rotary motion, thus preserving the life of the diaphragms which by a rotary motion would otherwise be worn out.

Fig. 11 shows the indicator J' pointing in the direction of the letter "S," which indicates that the wall-valve or starting apparatus V² is turned off—in other words, that neither alcohol nor oil is being delivered at the burner or burners, while the pointing of the said indicator J' to the letters "A" or "O," respectively, indicates that either alcohol or oil is being delivered through the wall-valve or starting apparatus V² to the ignition-cup or the burner or burners.

D¹⁰ is a bracket supporting the lamp.

In starting the initial vaporization in and providing for the continuous operation of a plurality of burners by a single motion of the hand-wheel H' of the wall-valve or starting apparatus V² the following changes are required: A number of measuring-coils, Fig. 14, will be attached to and connected with the valve Z in the manner shown in Fig. 7, equal to the number of burners in a series. From each such measuring device M' a tube corresponding with the tube T¹¹ will connect with an alcohol-ignition receptacle R', located at each burner, and the required electrical connections will be made between such alcohol-receptacle R' and the same wall-valve or starting apparatus V², or the electrical connections may be made separately. In order to supply the oil to such plurality of burners, it is only necessary to connect the different burners each with an oil-tube branched off from the oil-supply tube T¹². (Shown in Fig. 1.)

We have shown and described two methods of operating the plunger P and the mechanism therefor. These two methods and the mechanism may be used together in coöperation or separately or independently without avoiding our invention. They supplement each other and make the operation of cleaning the vapor-outlet orifice more certain and more regular, and we therefore prefer to use them together.

In using the term "plunger" we intend to describe any device that will operate in the manner described. The vaporizing tube or receptacle has near its upper end a guard or guide for the plunger to hold it in position with its apex in line with the orifice O.

The needle ordinarily used in connection with the orifice or vaporizing-tubes may be used in connection with and as the terminal of the piston shown herein and in connection with the means of operating the same shown herein without avoiding our invention.

The downwardly-extending and upwardly-inducting air-induction tube or tubes shown in Figs. 2 and 3 are not claimed in this application, but are claimed in another application.

We claim as our invention—

1. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, said plunger being located wholly within the vaporizing tube or receptacle and an extension thereof.

2. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, said plunger being located wholly within the vaporizing tube or receptacle and an extension thereof.

3. In a hydrocarbon-burner, a vaporizing tube or receptacle provided with a nozzle having an orifice which itself regulates the flow of the hydrocarbon vapor from the vaporizing tube or receptacle, in combination with means for automatically cleaning said orifice while the burner is in operation, said plunger being located wholly within the vaporizing tube or receptacle and an extension thereof.

4. In a hydrocarbon-burner, a vaporizing tube or receptacle provided with an orifice which itself regulates the flow of the hydrocarbon vapor from the vaporizing tube or receptacle, in combination with means for automatically cleaning said orifice while the burner is in operation, said plunger being located wholly within the vaporizing tube or receptacle and an extension thereof.

5. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by a spring.

6. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure.

7. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure and a spring.

8. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure in combination with a spring.

9. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, and also in combination with a mixing-tube in which the hydrocarbon vapor is mixed with air.

10. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, and also in combination with a mixing-tube in which the hydrocarbon vapor is mixed with air.

11. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure in combination with a spring, and also in combination with a mixing-tube in which the hydrocarbon vapor is mixed with air.

12. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure in combination with a spring, and also in combination with a mixing-tube in which the hydrocarbon vapor is mixed with air.

13. In a hydrocarbon-burner, a vaporizing tube or receptacle provided with a nozzle having an orifice which itself regulates the flow of the hydrocarbon vapor from the vaporizing tube or receptacle, in combination with means for automatically cleaning said orifice while the burner is in operation, and also in combination with a mixing-tube in which the hydrocarbon vapor is mixed with air.

14. In a hydrocarbon-burner, a vaporizing tube or receptacle provided with an orifice which itself regulates the flow of the hydrocarbon vapor from the vaporizing tube or receptacle, in combination with means for automatically cleaning said orifice while the burner is in operation, and also in combination with a mixing-tube in which the hydrocarbon vapor is mixed with air.

15. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, and also in combination with a mixing-tube in which the hydrocarbon vapor is mixed with air, and with an air-induction tube or tubes.

16. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, and also in combination with a mixing-tube in which the hydrocarbon vapor is mixed with air, and with an air-induction tube or tubes.

17. In a hydrocarbon-burner, a vaporizing tube or receptacle provided with a nozzle having an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure in combination with a spring, and also in combination with a mixing-tube in which the hydrocarbon vapor is mixed with air, and with an air-induction tube or tubes.

18. In a hydrocarbon-burner, a vaporizing tube or receptacle provided with an orifice which itself regulates the flow of the hydrocarbon vapor from the vaporizing tube or receptacle, in combination with a plunger that automatically cleans said orifice while the burner is in operation, the plunger being moved in one direction by oil-pressure and in the other by vapor-pressure in combination with a spring, and also in combination with a mixing-tube in which the hydrocarbon vapor is mixed with air, and with an air-induction tube or tubes.

19. In a hydrocarbon-burner, a vaporizing tube or receptacle provided with a nozzle having an orifice which itself regulates the flow of the hydrocarbon vapor from the vaporizing tube or receptacle in combination with means for automatically cleaning said orifice while the burner is in operation, and also in combination with a mixing-tube in which the hydrocarbon vapor is mixed with air, and with an air-induction tube or tubes.

20. In a hydrocarbon-burner, a vaporizing tube or receptacle provided with an orifice which itself regulates the flow of the hydrocarbon vapor from the vaporizing tube or receptacle in combination with means for automatically cleaning said orifice while the burner is in operation, and also in combination with a mixing-tube in which the hydrocarbon vapor is mixed with air, and with air-induction tubes.

21. In hydrocarbon-burners, an automatic fluid-measuring device substantially as shown and described, which supplies fluid to initiate action in the vaporizing-tube of said burner.

22. In hydrocarbon-burners, an automatic fluid-measuring device substantially as shown and described, which supplies fluid to initiate action in the vaporizing-tube, in combination with ignition-producing devices for the purpose of lighting the said fluid.

23. In hydrocarbon-burners, in combination with the hydrocarbon-oil-supply connections thereof, a valve which has a piston, a spring pressing the said piston down into a seat and a stem connecting said piston with an imperforate diaphragm secured permanently and independently of the operating means, constructed substantially as shown and described.

24. In hydrocarbon-burners, in combination with the air-supply connections thereof, a valve which has a piston, a spring pressing the said piston down into a seat and a stem connecting said piston with an imperforate diaphragm secured permanently and independently of the operating means, constructed substantially as shown and described.

25. In hydrocarbon-burners, a fluid-supply-controlling valve consisting of a valve portion having a piston, a seat therefor, a spring pressing said piston into said seat and a stem connecting said piston with an imperforate diaphragm secured permanently and independently of the operating means.

26. In hydrocarbon-burners, an air-supply-controlling valve consisting of a valve portion having a piston, a seat therefor, a spring pressing said piston into said seat and a stem connecting said piston with an imperforate diaphragm secured permanently and independently of the operating means.

27. In hydrocarbon-burners, in combination with air and hydrocarbon-oil supply connections a valve for each of said connections constructed substantially as shown and described, and each valve provided with operating means and means for operating the same by gearwork and at one continuous movement in one direction and for operating only the oil-supply valve by and during the reversal of that movement, substantially as shown and described.

28. In hydrocarbon-burners, a vaporizing-tube provided with a longitudinal cleaning device which cleans the vapor-escape orifice automatically while the burner is in operation, actuated by a piston movable in a cylinder and upon a seat, the vaporizing-tube being provided with an inlet for oil and an outlet for vapor, substantially as shown and described.

29. In hydrocarbon-burners, a plurality of automatic fluid-measuring devices substantially as shown and described, in combination with a plurality of vaporizing tubes or receptacles, for the purpose of supplying fluid to initiate action therein.

30. In hydrocarbon-burners, a plurality of automatic fluid-measuring devices substantially as shown and described, in combination with a plurality of vaporizing tubes or receptacles, for the purpose of supplying fluid to initiate action therein and in combination with a plurality of electric lighting devices for the purpose of lighting the fluid.

31. In hydrocarbon-burners, an automatic measuring device for fluid located between and connecting a tank or source of supply and the fluid-receptacle for burning the same and initially vaporizing the hydrocarbon oil in the vaporizing tube or receptacle of said hydrocarbon-burner, substantially as shown and described.

32. In hydrocarbon-burners, an automatic fluid-measuring device located between and connecting with a tank or source of supply and the fluid-receptacle for burning the fluid and initially vaporizing the hydrocarbon oil in the vaporizing tube or receptacle and means for lighting the same at the burner, substantially as shown and described.

33. In hydrocarbon-burners, a vaporizing tube or receptacle provided with a nozzle having an orifice, in combination with a plunger that automatically cleans said orifice, the plunger being operated in one direction by oil-pressure and in the other direction by a spring.

34. In hydrocarbon-burners, a vaporizing tube or receptacle, with a nozzle having an orifice, in combination with a plunger that automatically cleans said orifice while the burner is in operation, the plunger being operated in one direction by oil-pressure and in the other direction by a spring.

35. In hydrocarbon-burners, a vaporizing tube or receptacle provided with an orifice, in combination with a plunger that automatically closes said orifice, the plunger being operated in one direction by oil-pressure and in the other direction by a spring.

36. In hydrocarbon-burners, a vaporizing tube or receptacle provided with an orifice, in combination with a plunger that automatically opens said orifice, the plunger being operated in one direction by oil-pressure and in the other direction by a spring.

37. In hydrocarbon-burners, a vaporizing tube or receptacle, provided with an orifice, in combination with a plunger that automatically closes and opens said orifice, the plunger being operated in one direction by oil-pressure and in the other direction by a spring.

38. In hydrocarbon-burners, a vaporizing tube or receptacle provided with an orifice in combination with a plunger that automatically closes opens and cleans said orifice, the plunger being operated in one direction by oil-pressure and in the other direction by a spring.

39. In hydrocarbon-burners, the combination of a reservoir for inflammable fluid, a cup, connections from the reservoir to the cup, and an automatic measuring device for measuring a charge of the inflammable fluid, located between the reservoir and the cup.

40. In hydrocarbon-burners, the combination of a reservoir for inflammable fluid, a cup, connections from the reservoir to the cup, an automatic measuring device for measuring a charge of the inflammable fluid, located between the reservoir and the cup, and an electric igniter for igniting the charge in the cup.

41. In hydrocarbon-burners, the combination of a reservoir for inflammable fluid, a cup, connections from the reservoir to the cup, an automatic measuring device for measuring a charge of the inflammable fluid, located between the reservoir and the cup, and an igniter for igniting the charge in the cup.

42. In hydrocarbon-burners, the combination of a reservoir for inflammable fluid, a cup, connections from the reservoir to the cup, an automatic measuring device for measuring a charge of the inflammable fluid, located between the reservoir and the cup, an electric igniter in the cup, a valve and means for controlling the flow of the fluid from the reservoir into the cup.

43. In hydrocarbon-burners, the combination of a reservoir for inflammable fluid, a cup, connections from the reservoir to the cup, an automatic measuring device for measuring a charge of the inflammable fluid, located between the reservoir and the cup, an igniter in the cup, a valve and means for controlling the flow of the fluid from the reservoir into the cup.

44. In hydrocarbon-burners, the combination of a reservoir for inflammable fluid, a cup, connections from the reservoir to the cup, an automatic measuring device for measuring a charge of the inflammable fluid, located between the reservoir and the cup, an electric igniter in the cup, a valve and means for controlling the flow of the fluid from the reservoir into the cup and also the ignition of the fluid in the cup, and also a valve and means for controlling and for conducting the flow of the hydrocarbon oil from the reservoir to and into the vaporizing tube or receptacle of a hydrocarbon-burner.

45. In hydrocarbon-burners, the combination of a reservoir for inflammable fluid, a cup, connections from the reservoir to the cup, an automatic measuring device for measuring a charge of the inflammable fluid, located between the reservoir and the cup, an igniter in the cup, a valve and means for controlling the flow of the fluid from the reservoir into the cup and also the ignition of the fluid in the cup, and also a valve and means for controlling and for conducting the flow of the hydrocarbon oil from the reservoir to and into the vaporizing tube or receptacle of a hydrocarbon-burner.

46. In hydrocarbon-burners, the combination of a reservoir for inflammable fluid, a cup, connections from the reservoir to the cup, an automatic measuring device for measuring a charge of the inflammable fluid, located between the reservoir and the cup, an electric igniter in the cup, a valve and means for controlling the flow of the fluid from the reservoir into the cup and also the ignition of the fluid in the cup, and also a valve and means for controlling and for conducting the flow of the hydrocarbon oil from the reservoir to and into the vaporizing tube or receptacle of a hydrocarbon-burner, both valves and the igniter set in operation and controlled by the continued movement of a single device connected therewith by suitable intermediate mechanism.

47. In hydrocarbon-burners, the combination of a reservoir for inflammable fluid, a cup, connections from the reservoir to the cup, an automatic measuring device for measuring a charge of the inflammable fluid, located between the reservoir and the cup, an igniter in the cup, a valve and means for controlling the flow of the fluid from the reservoir into the cup and also the ignition of the fluid in the cup, and also a valve and means for controlling and for conducting the flow of the hydrocarbon oil from the reservoir to and into the vaporizing tube or receptacle of a hydrocarbon-burner, both valves and the igniter set in operation and controlled by the continued movement of a single device connected therewith by suitable intermediate mechanism.

48. In a hydrocarbon-burner, a vaporizing tube or receptacle provided with an outlet for the vapor which is normally open and itself regulates the flow of the hydrocarbon vapor from the tube or receptacle, in combination with a plunger the point of which is advanced into the orifice by the pressure of the initially-incoming oil-supply so as to automatically close the outlet but which subsequently retreats and opens the outlet automatically under vapor-pressure and thereafter vibrating under varying pressures, automatically enters and cleans said orifice at intervals while the burner is in operation.

49. In a hydrocarbon-burner, a vaporizing tube or receptacle provided with an outlet for the vapor, in combination with a point or plunger which is advanced into the orifice by the pressure of the initially incoming oil-supply so as to automatically close the outlet but which subsequently retreats from and opens the outlet automatically under vapor-pressure and thereafter vibrating under varying pressures, automatically enters and cleans said orifice at intervals while the burner is in operation.

50. In a hydrocarbon-burner, a vaporizing tube or receptacle provided with an orifice which itself regulates the flow of the hydrocarbon vapor from the tube or receptacle, in combination with a plunger that initially and automatically closes the orifice and prevents the escape of oil and vapor.

51. In a hydrocarbon-burner, a vaporizing tube or receptacle provided with an orifice which itself regulates the flow of the hydrocarbon vapor from the tube or receptacle, in combination with a plunger or needle that initially and automatically closes the orifice and prevents the escape of oil and vapor, and subsequently automatically opens the orifice and permits the free escape of hydrocarbon vapor.

52. In a hydrocarbon-burner, a vaporizing tube or receptacle provided with an orifice, in combination with a plunger or needle that initially and automatically closes the orifice and prevents the escape of oil and vapor, and subsequently automatically opens the orifice and permits the free escape of hydrocarbon vapor.

53. In a hydrocarbon-burner, a vaporizing tube or receptacle provided with an orifice which itself regulates the flow of the hydrocarbon vapor from the tube or receptacle, in combination with a plunger that initially and automatically closes the orifice and prevents the escape of oil and vapor, that automatically opens the orifice and permits the free escape of hydrocarbon vapor and subsequently automatically and intermittently traverses and cleans said orifice while the burner is in operation.

54. In a hydrocarbon-burner, a vaporizing tube or receptacle provided with an orifice, in combination with a plunger that initially and automatically closes the orifice and prevents the escape of oil and vapor, that automatically opens the orifice and permits the free escape of hydrocarbon vapor and subsequently automatically and intermittently traverses and cleans said orifice while the burner is in operation.

55. In a hydrocarbon-burner, a vaporizing tube or receptacle provided with an orifice which itself regulates the flow of the hydrocarbon vapor from the tube or receptacle, in combination with a plunger that initially and automatically closes the orifice and prevents the escape of oil and vapor, that automatically opens the orifice and permits the free escape of hydrocarbon vapor and subsequently automatically and intermittently traverses and cleans said orifice while the burner is in operation and without permanently extinguishing its flame.

56. In a hydrocarbon-burner, a vaporizing tube or receptacle provided with an orifice, in combination with a plunger that initially and automatically closes the orifice and prevents the escape of oil and vapor, that automatically opens the orifice and permits the free escape of hydrocarbon vapor and subsequently automatically and intermittently traverses and cleans said orifice while the burner is in operation and without permanently extinguishing its flame.

57. In a hydrocarbon-burner, a vaporizing tube or receptacle provided with an orifice, in combination with a plunger that automatically closes the orifice and prevents the escape of oil, automatically opens the orifice and permits the escape of hydrocarbon vapor and automatically enters and cleans said orifice while the burner is in operation.

58. In a hydrocarbon-burner, an automatic fluid-measuring device consisting of a valve portion or piston, a seat, a perforated diaphragm, and a stem connecting said diaphragm with the said piston, and a receptacle for measuring a definite quantity of fluid.

59. In a hydrocarbon-burner, an automatic fluid-measuring device consisting of a valve portion, a piston, a seat, a perforated diaphragm, and a stem connecting said diaphragm with the said piston, and a receptacle for measuring a definite quantity of fluid, together with an inlet for the said fluid into the valve portion, connecting with the source of fluid-supply, the piston being so arranged that the influx of the said fluid will automatically raise said piston from its seat and permit the measuring-receptacle to be filled.

60. In hydrocarbon-burners, an automatic fluid-measuring device consisting of a valve portion, a piston, a valve-seat, a diaphragm, a connecting-channel between the space above and the space below the diaphragm and a stem connecting said diaphragm with said piston, together with a receptacle for measuring a definite quantity of fluid.

61. In a hydrocarbon-burner, a vaporizing tube or receptacle provided with a vapor-outlet orifice and a closing, opening and cleaning device therefor, in combination with a helix in circuit arranged to operate the device intermittently and automatically for the purpose of closing and opening the outlet-orifice and cleaning the same.

62. In a hydrocarbon-burner, a vaporizing tube or receptacle provided with an outlet for the vapor which is normally open and itself regulates the flow of the hydrocarbon vapor from the tube or receptacle, and also provided with a closing, opening and cleaning device therefor, in combination with a helix in circuit arranged to operate the device intermittently and automatically for the purpose of closing, opening and cleaning the orifice.

63. In a hydrocarbon-burner, a vaporizing tube or receptacle provided with a vapor-outlet orifice and a closing, opening and cleaning device therefor, in combination with a helix in circuit provided with clockwork arranged to automatically make and break the circuit and operate the closing, opening and cleaning device intermittently and automatically.

64. In a hydrocarbon-burner, a vaporizing tube or receptacle provided with a vapor-outlet orifice and a closing, opening and cleaning device therefor, a helix in circuit arranged to operate the device intermittently and automatically, and clockwork located in circuit and arranged to make and break the circuit, in combination with a wall-valve and train for initially lighting and supplying the vaporizing-tube with oil.

65. In a hydrocarbon-burner, a vaporizing tube or receptacle provided with a vapor-outlet orifice and a closing, opening and cleaning device therefor, a helix in circuit arranged to operate the device intermittently and automatically, and clockwork located in circuit and arranged to make and break the circuit, in combination with a wall-valve and train for initially lighting and supplying the vaporizing-tube with oil, the clockwork being connected with the wall-valve by train so as to be wound up by or through the same mechanism that initially sets the lamp or burner in operation.

66. The combination of a reservoir or source of supply, with a valve connected thereto and regulating the supply from the said reservoir or source of supply, said valve to consist of a valve portion, a piston, a seat, a spring, an imperforate diaphragm secured permanently and independently of the operating means, and means for operating the same, substantially as shown and described.

67. The combination of a reservoir or source of supply, with a supply-controlling valve connected therewith and consisting of a valve portion having a piston, a seat therefor, a spring pressing said piston into said seat, a stem connecting said piston with an imperforate diaphragm secured permanently and independently of the operating means, and means for operating the same, substantially as shown and described.

68. The combination of a reservoir or receptacle for fluid connected with a valve and automatic measuring device, said valve to consist of a piston, a seat therefor, a diaphragm to operate in connection therewith, means of communication between the upper side of the diaphragm and the annular space surrounding the piston, a measuring-coil, device or receptacle connecting with said valve, and means for operating the same, substantially as shown and described.

69. The combination of a reservoir or receptacle for fluid connected with a valve and automatic measuring device, said valve to consist of a piston, a seat therefor, a diaphragm to operate in connection therewith, means of communication between the upper side of the diaphragm and the annular space surrounding the piston, a plurality of measuring-receptacles connecting with said valve and means for operating the same, substantially as shown and described.

70. In hydrocarbon-burners, a vaporizing tube or receptacle, provided with an orifice, in combination with a plunger or closer that automatically cleans said orifice the plunger being moved in one direction by oil-pressure and in the other by a spring.

71. In hydrocarbon-burners, a vaporizing tube or receptacle, provided with an orifice in combination with a plunger that automatically cleans said orifice, the plunger or closer being moved by suitable means deriving the necessary energy through an electrical circuit and from a source of electricity.

EMIL PHILLIPSON.
HAYDN M. BAKER, JR.
WILLIAM B. SABEL.

Witnesses:
HAYDN M. BAKER, SR.,
EDWARD S. BERRALL.